United States Patent [19]
Vallet et al.

[11] Patent Number: 4,676,474
[45] Date of Patent: Jun. 30, 1987

[54] EJECTION COUPLING FOR AN INJECTION PRESS

[76] Inventors: Marc Vallet, 4, rue de la Republique; Claude Rinaldi, Billiat, both of Bellegarde (Ain), France

[21] Appl. No.: 779,789

[22] Filed: Sep. 24, 1985

[30] Foreign Application Priority Data

Sep. 26, 1984 [FR] France ............................... 84 15335

[51] Int. Cl.⁴ ............................................. B29C 45/40
[52] U.S. Cl. ...................................... 249/68; 425/537; 425/556
[58] Field of Search ............... 425/450.1, 451.3, 451.4, 425/451.5, 451.9, 537, 567, 592, 589, 595, 554, 556; 249/67, 68

[56] References Cited

U.S. PATENT DOCUMENTS 4,248,583 2/1981 Hedke et al. ..................... 425/451.9
4,412,806 11/1983 Gaiser et al. ......................... 425/537

FOREIGN PATENT DOCUMENTS 2438386 2/1975 Fed. Rep. of Germany.
2357962 5/1975 Fed. Rep. of Germany.

Primary Examiner—Jay H. Woo
Assistant Examiner—Timothy W. Heitbrink
Attorney, Agent, or Firm—Karl F. Ross; Herbert Dubno

[57] ABSTRACT

A coupling provides for the control of the ejection assembly of a mold. It consists of an ejection member fastened to this assembly and of a claw which can be adapted to control means in the injection press. A tip which is fastened to these means is extended by a rod around which there are mounted jaws, which can tilt and which are themselves surrounded by a sliding sleeve. In an advanced position, the sleeve maintains the jaws tightened so that they retain the head of the ejection lug. In the recessed position, the sleeve maintains the jaws spread out, so as to liberate the head.

13 Claims, 14 Drawing Figures

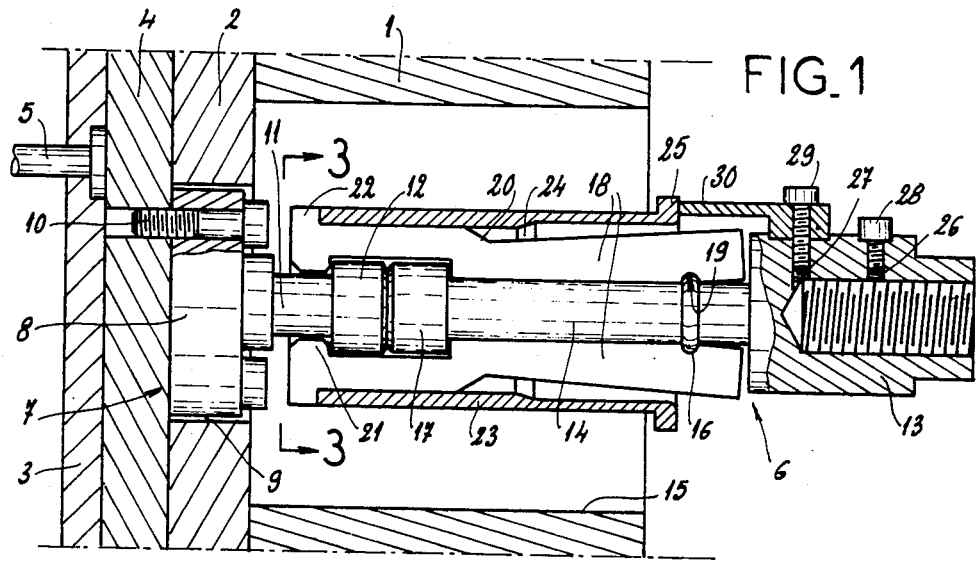
FIG_1
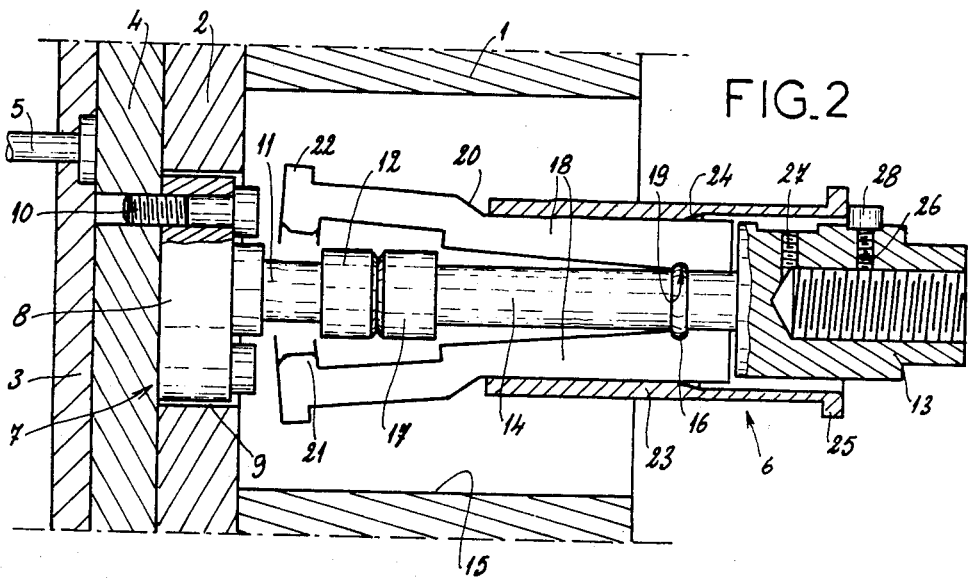
FIG_2
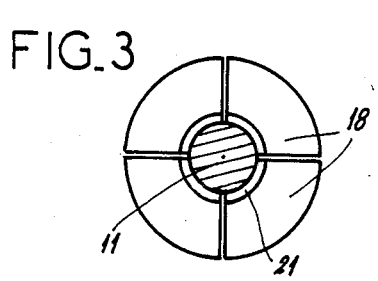
FIG_3
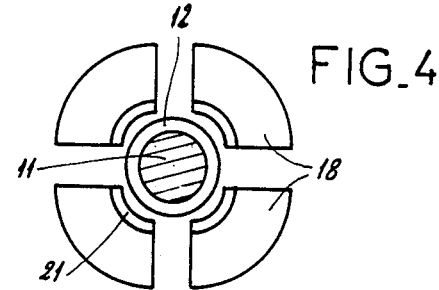
FIG_4

EJECTION COUPLING FOR AN INJECTION PRESS

FIELD OF THE INVENTION

This invention relates to an ejection coupling for an injection press, i.e. a connection device which can be separated between the ejection assembly of a mold mounted on the press and a control means such as a jack present in the usual manner on the injection press.

BACKGROUND OF THE INVENTION

In this particular field of technology, coupling means are presently used the most important part of which is set permanently onto the molds. Thus equipping an injection press shop is very costly since not only are the parts to be set onto the presses unique, but the special expensive parts for the molds must be multiplied by the number of molds which is generally large.

Furthermore, present day devices comprise ball spring mechanisms which produce coupling and uncoupling at each mold opening-closing cycle, which gives rise to the necessity for precise adjustments of the machine as well as to a rapid wear and frequent breakdownws resulting in defective operation.

In addition, the assembly of present day devices onto mold ejection assemblies is very time consuming.

Finally, presently available devices are not adaptable to all injection presses and, for example cannot be used with presses of over 300 tons.

OBJECT OF THE INVENTION

This invention aims to correct all of these, drawbacks by providing a device which can be adapted to types of injection presses without any limitation, this device being simple, resistant, reliable and less expensive than present day devices and of a nature which permits its installation in a very short time.

SUMMARY OF THE INVENTION

To this effect, the invention relates to an ejection coupling for an injection press comprising essentially an ejection lug set on a mold ejection assembly and having an enlarged head and a claw consisting of movable jaws mounted so as to tilt around a common support integral with a tip which can be adapted on control means present in the press, the jaws being surrounded by a sliding sleeve which, in an advanced position, maintains these jaws in a tightened position so as to retain the head of the ejection lug and which, in a recessed position, maintains the jaws in a dissociated position so as to liberate the head of the ejection lug, locking means being provided so as to temporarily block the sleeve in an advanced position.

This ejection coupling does not comprise any spring, balls or other fragile member, which makes is particularly strong. The main part thereof forming the claw, which is to be set onto the press by fitting on a jack or plate, constitutes a single investment. The other part thereof known as a "ejection lug", which is specific for each mold, is very simple and therefore moderately priced, so that, all of the requirement of a press shop corresponds to an overall cost which is reduced to approximately one quarter of the investment presently necessary.

Using dimensions which are of course proportional to the tonnage of the press, the device according to the invention can be adapted, without any limitation, to all types of injection presses.

The tightening of the jaws comprising the claw, blocked by the locking means, makes the ejection lug of the mold continuously integral with the "claw" part and makes it possible to systematically control the withdrawal of the ejection assembly throughout the entire period of use of a given mold without any separation of the parts during operation.

According to a preferred embodiment of the invention, the jaws of the claw are mounted so as to tilt around a rod extending from the tip of a jack, which rod has a collar near the tip and ends in an enlarged head whereas the interior face of each jaw has a groove in which a part of the collar is engaged as well as, near its forward extremity, a cog which can retain the head of the ejection lug and the head connected to the tip, when the jaws are tightened.

In order to actuate the closure of the claw, each jaw in the latter advantageously has on its exterior face, an inclined railing as well as thrust-bearing located near its forward extremity, both of these being provided so as to cooperate with the sliding sleeve. In order to actuate the opening of the claw, the sliding sleeve can itself also have, on the inside, an inclined railing provided so as to cooperate with the jaws of the claw. The connection between the actuating means located on the press and the ejection assembly comprising the mold or conversely, their separation, can thus be obtained in a very short time which may be just enough to effect displacement by a sliding action of the sleeve and for the locking and unlocking thereof through action on the locking means.

These locking means comprise, in a particular embodiment, a thrust bearing mounted in a removable manner on the tip of a jack, this thrust bearing cooperating with the rear extremity of the sliding sleeve so as to prevent any recoil of the latter when the thrust bearing is set into place. The tip of the jack has, preferably, a second thrust bearing which can stop the sleeve in its recessed position so as to avoid any separation of the various parts of the claw.

According to another embodiment, the locking means comprise a single thrust-bearing carried by the tip of the jack, which thrust bearing can be introduced either into a groove shaped as an arc of a circle provided at the rear extremity of the sliding sleeve or into a longitudinal slit of that sleeve starting at its rear extremity and extending over a fraction of its length. The sleeve described, in such a case, a combined sliding motion which actuates the closure and opening of the claw and a rotational motion which actuates locking and unlocking operations.

According to another embodiment, the locking means comprise, on the one hand, an "L" shaped groove, with a part oriented longitudinally and a part oriented in a crosswise direction provided in the tip of a jack and, on the other hand, a pin supported by the sliding sleeve projecting on the inside of this sleeve and engaged in the "L" shaped groove. The "L" shaped groove determines, again in this case, a combined sliding and rotational motion of the sleeve, the pin being engaged in the crosswise part of the groove in order to ensure the locking of the claw in the closure position. Axial indexing means are further advantageously provided in a rotational mode of the sliding sleeve; these indexing means can comprise at least one spring push-rod supported by the jack tip, cooperating with at least one longitudinal "V" shaped groove and at least one annular "V" shaped groove provided on the internal wall of the sliding sleeve.

The embodiments defined above relate essentially to manually controlled couplings. It is also possible to provide for a hydraulic remote control by setting up an annular chamber between the jack tip and the sliding sleeve as well as means for supplying hydraulic fluid to the annular chamber for the purpose of inducing the retreat of the sliding sleeve, the latter being drawn back towards its forward locking position by spring means. These means, such as a stack of spring washers, acting in the direction of closure, ensure the locking of the coupling by themselves. Since the injection presses are always provided with a hydraulic unit, the addition of this remote control system, acting as a simple effect jack, is relatively easy and economical; it also has the advantage of solving access problems which may occur in the case of couplings requiring manual intervention.

According to another characteristic of the invention, providing for the adjustment of the same ejection coupling to a press used with a dummy plate, this coupling is completed by a an extension comprising a tip which can be adapted on the head of the ejection lug and a rod ending in a head similar to the preceding one and which can be retained in the claw formed by the movable jaws. The tip of the extension preferably has a housing opening towards the front and on the side in order to receive the head of the jection lug and it is provided with an adjusting screw which prevents any axial motion of said head.

BRIEF DESCRIPTION OF THE DRAWING

The invention will be more clearly understood in the light of the following description in reference to the appended schematic drawing showing several embodiments of the ejection coupling:

FIG. 1 is a longitudinal sectional view of an injection coupling for an injection press in accordance with this invention, in the locked position;

FIG. 2 is a longitudinal sectional view similar to FIG. 1, but showing the ejection coupling in an unlocked position;

FIG. 3 is a cross-sectional view of this ejection coupling, in a locked position taken along line 3—3 of FIG. 1;

FIG. 4 is a view similar to FIG. 3, but corresponding to the unlocked position;

SPECIFIC DESCRIPTION

Figure 5:
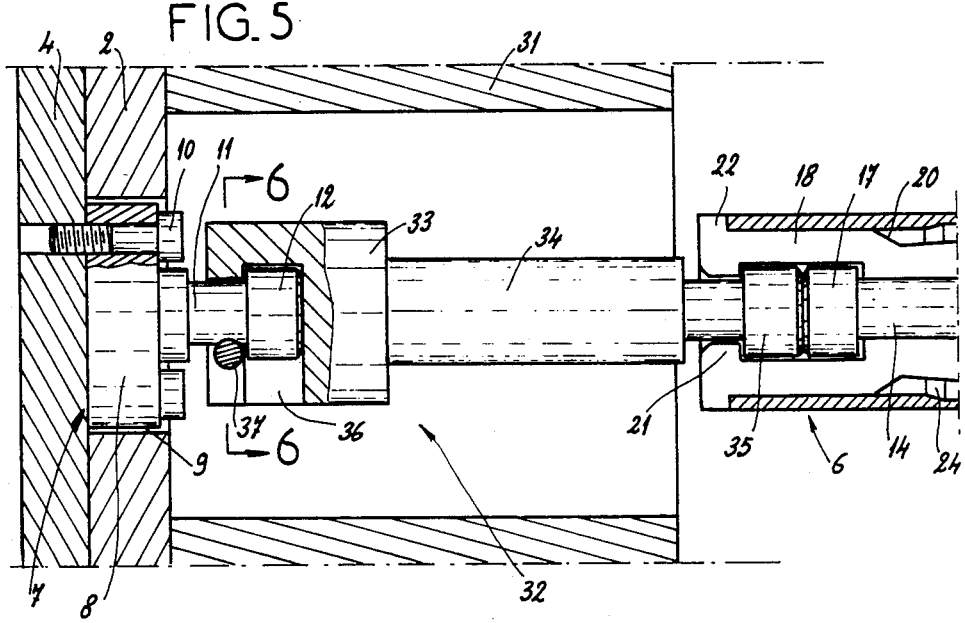
FIG. 5 is a partial longitudinal sectional view of the preceding ejection coupling, completed by an extension so that it can be adapted to a press used with a dummy plate.

FIGS. 1 and 2 show, in a partial manner, an injection press plate 1 on which is mounted a mold base plate 2. An ejection assembly, which is also shown partially, comprises an ejection plate 3 and a check plate 4 between which the ejector heads 5 are retained.

The ejection coupling 6, which is the object of this invention, comprises on the side of the mold, an ejection lug 7, with a base 8 housed in a recess 9 of the base plate 2 and fastened by means of a screw 10 to the check plate 4 of the mold ejection assembly and with a short rod 11 ending with an enlarged head 12.

On the side of the press, the ejection coupling 6 includes a jack tip 13, which is fastened by screwing to a jack in the press, not shown, and extended by a rod 14 into a recess 15 of the plate 1. The rod 14 has a collar 16 close to the tip 13 and ends in an enlarged head 17.

A claw is formed around the rod 14 by four extended jaws 18 each occupying a 90° sector—see also FIGS. 3 and 4. Each jaw 18 has, on its interior face, a groove 19 in which is engaged a part of the collar 16, while it has an inclined railing or ramp 20 on its exterior face. Each jaw 18, on its forward face, has a pole face which, on the interior side, forms a cog 21 and on the exterior side forms a thrust member 22.

A sliding sleeve 23 is mounted around jaws 18. The sleeve 23 has on the inside, an inclined railing or ramp 24, and on the outside, at its rear extremity, a collar 25.

The jack tip 13 comprises two taps 26, 27 in a radial direction. The first tap 26, located the furthest to the rear, receives an adjusting screw 28. The second tap 27 provides for the fastening of a rear removable thrust bearing 30 by means of a screw 29.

In the locked position (FIGS. 1 and 3), the thrust member 30 is in position and bears against the collar 25 of sleeve 23 which is then pushed to the left around the jaws 18. In that position, the sleeve 23 maintains the jaw 18 tightened around the rod 14. Thus, the jaws 18 enclose the head 17 of the rod 14 as well as the head 12 of the rod 11, the cogs 21 preventing any release of the head 12. The coupling 6 with its claw closed and locked then links in a permanent manner the jack receiving the tip 13 to the ejection assembly 3, 4, 5 of the mold 2, and it makes it possible to actuate the motion of this ejection assembly throughout the entire period of use of the press with a given mold.

When a mold is changed, the rear thrust bearing 30 is removed and the sleeve 23 is moved back until it is stopped by the adjusting screw 28 which places the ejection coupling 6 in an unlocked position (FIGS. 3 and 4). As the sleeve 23 moves back, the forward parts of the jaws 18 are first cleared, after which the inclined ramp 24 of the sleeve 23 induces the tipping of the jaws 18 by allowing them to pivot around articulations formed by the collar 16 and the grooves 19. Finally, the forward extremities of the jaws 18 are moved away from the coupling axis and the head 12 is liberated, which makes it possible to separate the mold provided with its ejection lug 7 and to mount a similarly equipped mold in its place.

The ejection coupling 6 can then be locked again by moving the sleeve 23 forward so that through an action on the inclined ramp 20 of the jaws 18, the claw will close up on the two heads 12, 17. Finally, the setting back into position of the rear thrust member 30 ensures locking.

As shown in FIG. 5, when a dummy plate 31 is used, the same ejection coupling 6 be employed if it is simply completed by an extension 32. The latter comprises a tip 33 which adapts onto an ejection lug 7 connected to the ejection assembly as previously, and a rod 34 ending with a head 35, which is introduced and retained in the "claw" part, exactly in the same way as the head 12 of the ejection lug 7 in the preceding case.

Figure 6:
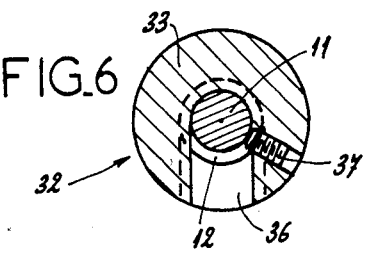
FIG. 6 is a cross-sectional view of said extension taken along line 6—6 of FIG. 5.

Also with reference to FIG. 6, it can be noted that the base 33 of the extension 32 has a housing 36 opening up to the front and on the side so as to allow the introduction and retention of the rod 11 and the head 12 of the ejection lug 7. The base 33 further comprises a radial tap receiving a set screw 37 which, when driven in, prevents any axial motion of the head 12.

Figure 7:
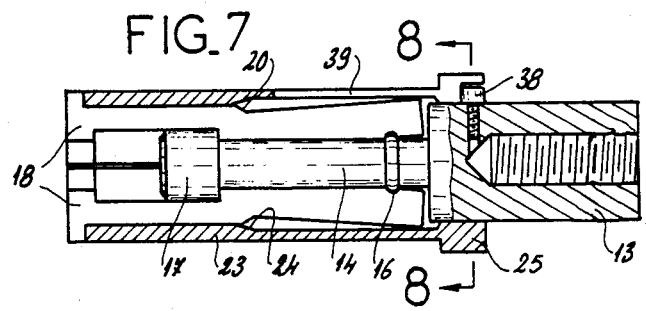
FIG. 7 is a longitudinal sectional view of a another embodiment of the ejection coupling which is the object of this invention, shown in a locked position.
Figure 8:
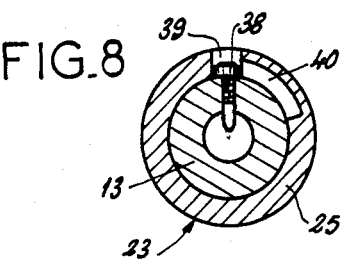
FIG. 8 is a cross-sectional view of this embodiment taken along line 8—8 of FIG. 7.

FIGS. 7 and 8 show an embodiment in which the removable rear thrust bearing has been eliminated, the jack tip 13 carrying a single adjusting screw 38. The sleeve 23 has, on a fraction of its length, a longitudinal slit 39 originating from its rear extremity where the collar 25 is located, in this case provided with a knurl. A groove shaped as an arc of a circle 40 is also provided at this rear extremity of the sleeve 23, the groove 40 issuing into the slit 39.

Thus, the locked position is obtained by advancing the sleeve 23 and by turning it, relative to the tip 13 such that the adjusting screw 38 is engaged in the groove 40. The unlocked position is obtained by turning the sleeve 23 so that the adjusting screw 38 is extracted from the groove 40 which makes it possible to move the sleeve 23 back, the head of the adjusting screw 38 becoming engaged in the slit 39.

Figure 11:
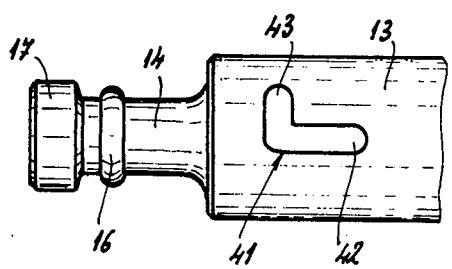
FIG. 11 only shows the tip of the embodiment according to FIGS. 9 and 10 in an elevational view.

FIGS. 9 to 12 showing another embodiment in which the longitudinal dimensions of the jaws 18 as well as the path of the sliding sleeve 23, are reduced without the principle of operation being modified. This embodiment differs especially from the previous embodiments by the structure of the locking means:

As shown in FIG. 11, the tip 13 has on its cylindrical face an "L" shaped groove 41, with a part 42 oriented longitudinally and another part 43 oriented in a crosswise direction. The sleeve 23 is provided with a locking pin 44 projecting on the inside and engaged in the "L" shaped groove 41—see FIG. 9. A removable lubricator 45 is also carried by the sleeve 23.

Figure 12:
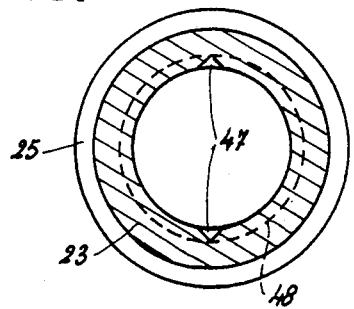
FIG. 12 is a cross-sectional view of the sliding sleeve of this latter embodiment.

Furthermore, the tip 13 contains two spring pushrods 46, which are used as indexing means in combination with two diametrically opposed longitudinal "V" shaped grooves 47 and one annular "V" shaped groove 38, provided on the internal wall of the sleeve 23—see, in particular, FIG. 12. The tip 13 further carries a finger 49 acting as an end of stroke thrust bearing for the sliding sleeve 23.

In the locked position (FIG. 9), the sleeve 23 is pushed back towards the front and entirely covers the jaws 18 in order to maintain them tightly around the two heads 14, 17 joined together. This position is maintained by the engagement of the locking pin 44 in the crosswise part 43 of the "L" shaped groove 41, thus preventing any axial motion of the sleeve 23. A rotational indexing of the sleeve 23, providing all the necessary safety, is supplied in this locked position through the cooperation of the two spring push-rods 46 with the two longitudinal grooves 47.

In order to unlock the coupling, the sleeve 23 is first turned by the collar 25 thereof provided with a knurl, after which this sleeve 23 is moved back, its axial sliding motion being guided by the slipping action of the pin 44 in the longitudinal part 42 of "L" shaped groove 41. When the sleeve 23 arrives in its most rearward position, clearing and liberating the jaws 18, an axial indexing is obtained through the cooperation of the two spring push-rods 46 with the annular groove 48—see FIG. 10.

Figure 9:
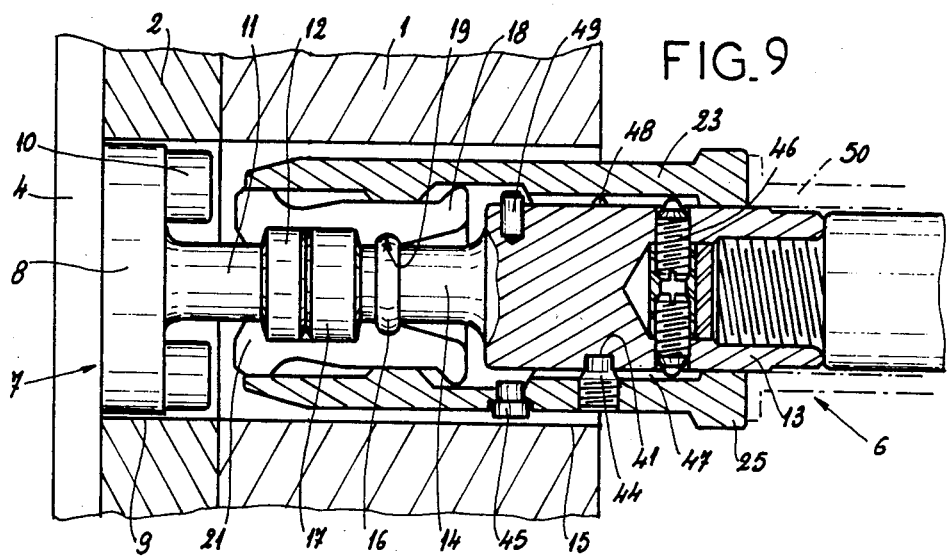
FIG. 9 is a longitudinal section of yet another embodiment of the ejection coupling which is the object of this invention, shown in a locked position.
Figure 10:
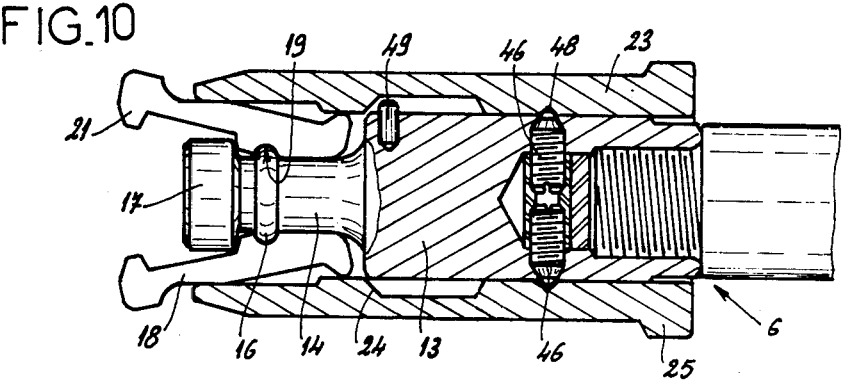
FIG. 10 is a longitudinal sectional view similar to the one in FIG. 9 but showing the ejection coupling in an unlocked position.

As indicated in broken lines in FIG. 9, the assembly can be mounted, if necessary, at the extremity of an extension 50.

Figure 13:
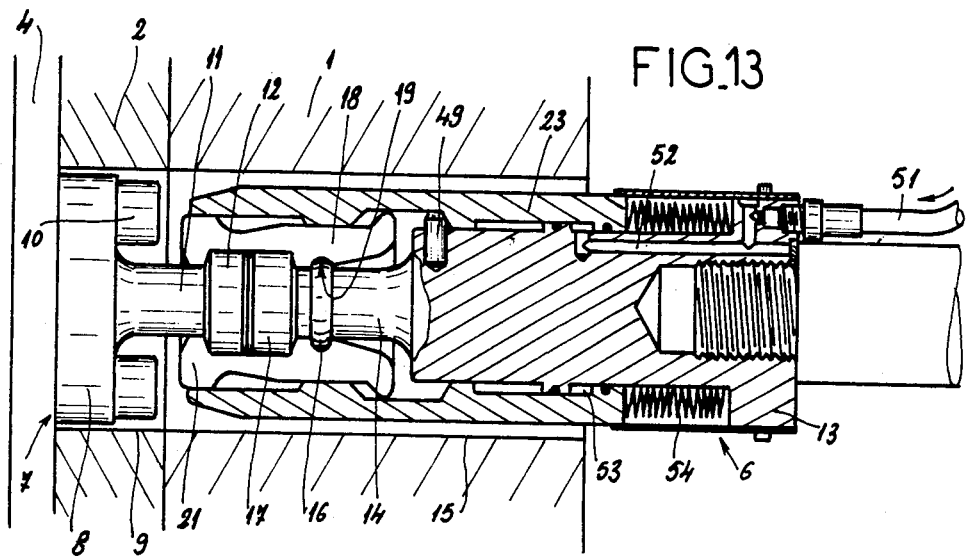
FIG. 13 is a longitudinal sectional view of an ejection coupling in accordance with the invention with a hydraulic remote control shown in a locked position.
Figure 14:
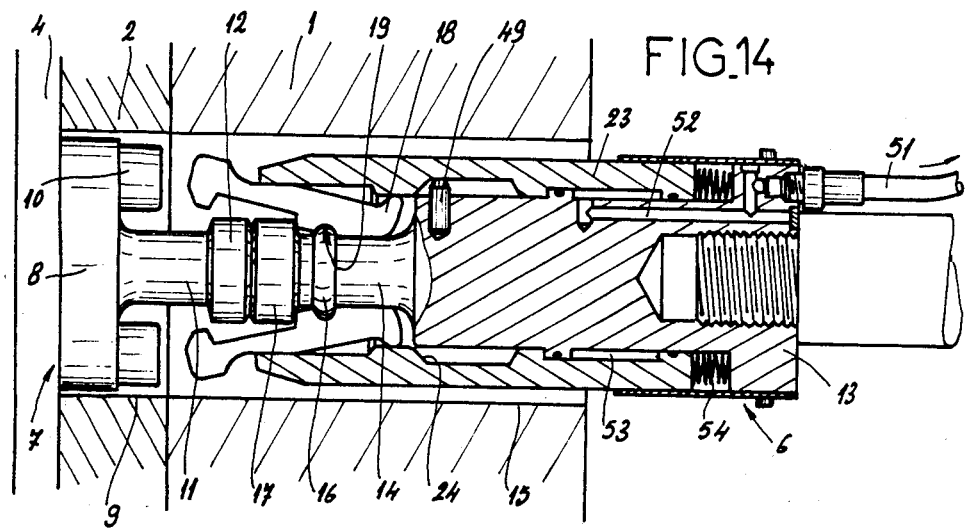
FIG. 14 is a longitudinal sectional view similar to the one in FIG. 13, but showing the ejection coupling in an unlocked position.

Finally, FIGS. 13 and 14 show a last embodiment which corresponds to the preceding one as regards the general conformation of the tip 13, the jaws 18 and the sliding sleeve 23, but which has a hydraulic remote control arrangement for the motion of the sleeve 23, whereas the latter is displaced manually in all the preceding cases.

To this effect, a supply of hydraulic fluid 51 is provided at the rear of the tip 13. An internal duct 52 causes the hydraulic fluid inlet 51 to communicate with an annular chamber 53 provided between the tip 13 and the sleeve 23. Spring washers 54 are stacked and compressed between an annular face of the tip 13 and another annular face belonging to the sleeve 23.

The stack of spring washers 54 tends to push the sleeve 23 forwards up to a position determined by the thrust finger 49 thus inducing the tightening of the jaws 18 by also reducing the volume of the annular chamber 53, which forces back the hydraulic fluid towards the outside—see FIG. 13. When the hydraulic fluid under pressure is transmitted through the inlet 51, it is received into the chamber 53 and the sleeve 23 is pushed back towards the rear, which clears and frees the jaws 18—see FIG. 14. The spring washers 54 are then compressed. The remote control for the unlocking action can be carried out by means of a button from the general control panel of the injection press. This control can also be entirely automatic and integrated into an automated mold changing system.

We claim:

1. An ejection assembly for an injection molding machine, comprising:
   a mold provided with an ejection plate, said ejection plate having an ejection lug formed with a rod and a head operatively connected to said rod;
   ejector control means on said machine having a tip aligned with said rod and said head, said tip being displaceable toward and away from said mold to displace said ejection plate; and
   an ejection coupling on said tip engageable with said head to couple said plate to said control means for displacement of said plate, but disengageable from said head for decoupling of said plate from said control means to permit replacement of said mold on said machine and coupling of the ejection lug of another mold to said control means, said ejection coupling comprising
   a common support mounted on said tip,
   a claw formed with movable jaws mounted so as to be tiltable on said common support between outwardly inclined positions corresponding to an open state of the claw when said head is released and inwardly disposed positions wherein said jaws grip said head in a closed state of the claw, a sleeve axially displaceable on said support and said tip and adapted to surround said jaws for displacing said jaws between said outwardly inclined positions of said jaws in an axially retracted position of said sleeve and said inwardly disposed positions of said jaws in an axially advanced position of said sleeve, and locking means on said support and said tip for temporarily locking said sleeve in said axially advanced position.

2. The ejection assembly defined in claim 1 wherein said support is a rod extending from said tip and formed with a collar close to said tip and with an enlarged head adapted to be axially juxtaposed with said head of said ejection lug, an internal face of each of said jaws being formed with a groove receiving a part of said collar, each of said jaws having a forward extremity at an end thereof proximal to said mold and formed with a cog engageable behind the head of said ejection lug when said jaws are displaced into said inwardly disposed positions.

3. The ejection assembly defined in claim 2 wherein each of said jaws has an external face provided with an inclined ramp, said ramp being engageable by a leading end of said sleeve upon displacement of said sleeve from said axially retracted position into said axially advanced position for duplicating said jaws from said outwardly inclined positions into said inwardly disposed positions, said jaws at said forward extremity having outwardly extending thrust formations against which said leading end of said sleeve is adapted to abut any axially advanced position.

4. The ejection assembly defined in claim 3 wherein said sleeve is provided with an inclined ramp slidably engageable with said jaws.

5. The ejection assembly defined in claim 2 wherein said locking means includes a thrust member removably mounted on said tip and engageable with a rear end of said sleeve in said axially advanced position of said sleeve.

6. The ejection assembly defined in claim 5, further comprising an abutment on said tip engageable with said rear end of said sleeve in said axially retracted position.

7. The ejection assembly defined in claim 2 wherein said locking means includes a member mounted on said tube and slidable in a longitudinal slit formed in said sleeve, said sleeve being rotatable relative to said tip and being provided with a slot transverse to said slit in which said member can be engaged when said sleeve is in said axially advanced position.

8. The ejection assembly defined in claim 2 wherein said locking means includes an L-shaped groove formed in said tip and having an axially extending part and a transversely extending part, and a pin projecting inwardly from said sleeve and engageable in said groove.

9. The ejection assembly defined in claim 8, further comprising axial indexing means on said tip and said sleeve, said axial indexing means effective to index said sleeve relative to said tip in said axially retracted position.

10. The ejection assembly defined in claim 9 wherein said indexing means includes at least one spring pushrod projecting from said tip and cooperating with at least one longitudinal V-shaped groove formed in said slit and at least one annular V-shaped groove formed in said sleeve and adapted to receive said pushrod.

11. The ejection assembly defined in claim 2, further comprising spring means bearing on said sleeve and urging said sleeve toward said axially advanced position, and hydraulic means acting on said sleeve against the force of said spring means and for urging said sleeve into said axially retracted position.

12. The ejection assembly defined in claim 1 wherein a dummy plate is provided at said mold, further comprising an extension formed with said head operatively connected to said rod and connected in tun to said rod.

13. The ejection assembly defined in claim 12, further comprising a setscrew locking said rod to said extension.

* * * * *